United States Patent
Lim et al.

(10) Patent No.: US 9,476,466 B2
(45) Date of Patent: Oct. 25, 2016

(54) METHOD AND APPARATUS FOR CONTROLLING CLUTCH USING FAIL-SAFE VALVE

(71) Applicant: Hyundai Autron Co., Ltd., Seongnam-si (KR)

(72) Inventors: Kwang Hyuk Lim, Suwon-si (KR); Chang Kyu Shin, Gunpo-si (KR); John Ha Lee, Suwon-si (KR); Jong Ik Choi, Seoul (KR); Se Hoon Son, Goyang-si (KR)

(73) Assignee: HYUNDAI AUTRON CO., LTD., Seongnam-Si (KR)

( * ) Notice: Subject to any disclaimer, the term of this patent is extended or adjusted under 35 U.S.C. 154(b) by 48 days.

(21) Appl. No.: 14/565,330

(22) Filed: Dec. 9, 2014

(65) Prior Publication Data
US 2016/0032989 A1 Feb. 4, 2016

(30) Foreign Application Priority Data
Aug. 1, 2014 (KR) .................. 10-2014-0098932

(51) Int. Cl.
*B60W 10/02* (2006.01)
*B60W 10/06* (2006.01)
*F16H 61/12* (2010.01)
*F16D 48/02* (2006.01)

(52) U.S. Cl.
CPC ............ *F16D 48/02* (2013.01); *F16D 25/14* (2013.01); *F16D 2048/0221* (2013.01)

(58) Field of Classification Search
CPC ............... B60W 10/06; B60W 10/02; F16D 2500/5114; F16D 2500/5116; F16H 2061/1252
See application file for complete search history.

(56) References Cited

U.S. PATENT DOCUMENTS

| 5,971,889 A | 10/1999 | Ohashi et al. |
| 2006/0169338 A1* | 8/2006 | Takagi .................. F16D 48/02 137/625.64 |
| 2009/0248266 A1* | 10/2009 | Oue ....................... F16H 61/143 701/68 |

FOREIGN PATENT DOCUMENTS

| DE | 100 31 180 A1 | 4/2001 | |
| JP | 2001-012588 A | 1/2001 | |
| JP | 2002266995 A * | 9/2002 | ............ F16H 61/00 |
| KR | 10-2002-0058881 A | 7/2002 | |

OTHER PUBLICATIONS

Korean Intellectual Property Office, Office Action for Korean patent application No. 10-2014-0098932, Sep. 11, 2015, Korea.
Deutsches Patent and Management Office, Office Action for German Patent Application No. 10 2014 117 858.0, Apr. 8, 2015.

* cited by examiner

*Primary Examiner* — Tisha Lewis
(74) *Attorney, Agent, or Firm* — Mayer Brown LLP; Hyunho Park

(57) ABSTRACT

Apparatus for controlling a clutch using a fail-safe valve, and the apparatus includes: a fail-safe valve which is moved to the left or right according to an on-off operation of an on-off solenoid valve; and a control unit configured to control the fail-safe valve through the on-off solenoid valve; wherein when engine torque is a predetermined reference value or more, the control unit turns off the on-off solenoid valve to move the fail-safe valve for applying line pressure to the clutch, and when the engine torque is lower than the predetermined reference value, the control unit turns on the on-off solenoid valve to move the fail-safe valve for applying control pressure to the clutch.

3 Claims, 3 Drawing Sheets

METHOD AND APPARATUS FOR CONTROLLING CLUTCH USING FAIL-SAFE VALVE

CROSS-REFERENCE TO RELATED APPLICATIONS

This application claims priority to and the benefit of Korean Patent Application No. 10-2014-0098932 filed in the Korean Intellectual Property Office on Aug. 1, 2014, the entire contents of which are incorporated herein by reference.

TECHNICAL FIELD

The present disclosure relates to a method and an apparatus for controlling a clutch using a fail-safe valve.

BACKGROUND ART

In an automatic transmission which is applied to a vehicle, a gear shift control apparatus controls hydraulic pressure by controlling a plurality of solenoid valves in accordance with a traveling speed of the vehicle, an opening degree of a throttle valve, and various detection conditions, such that a shift gear at a target gear shift stage is operated, and as a result, a gear shift operation is automatically performed.

That is, when a driver changes a range of the gear shift lever to a desired gear shift stage, a port change of a manual valve is performed, and hydraulic pressure supplied from an oil pump is selectively applied to various operational elements of a shift gear mechanism in accordance with a duty control of the solenoid valve, such that the gear shift operation is performed.

Meanwhile, when high torque is applied to a specific clutch, pressure corresponding to the high torque needs to be applied to the clutch, but in the related art, a slip may occur in the clutch due to a limitation of pressure that can be controlled by the solenoid valve, and the transmission may break down due to the slip.

SUMMARY OF THE INVENTION

The present disclosure has been made in an effort to provide a method and an apparatus for controlling a clutch using a fail-safe valve, which prevent a slip from occurring in the clutch even while engine torque is high.

An exemplary embodiment of the present disclosure includes an apparatus for controlling a clutch, comprises: a fail-safe valve which is moved to the left or right according to an on-off operation of an on-off solenoid valve; and a control unit configured to control the fail-safe valve through the on-off solenoid valve; wherein when engine torque is a predetermined reference value or more, the control unit turns off the on-off solenoid valve to move the fail-safe valve for applying line pressure to the clutch, and when the engine torque is lower than the predetermined reference value, the control unit turns on the on-off solenoid valve to move the fail-safe valve for applying control pressure to the clutch.

The fail-safe valve includes: a first port which is supplied with the control pressure from the on-off solenoid valve, a second port which is supplied with the control pressure from the solenoid valve, a third port which is supplied with the line pressure, a fourth port which supplies hydraulic pressure supplied from the second port or the third port to the clutch, a fifth port which discharges hydraulic pressure supplied to the fourth port, and a valve spool.

The valve spool includes: a first land on which the control pressure supplied to the first port is applied, a second land which selectively opens and closes the third port, and a third land which selectively connects the fourth port to the second port or the third port together with the second land.

When the on-off solenoid valve is turned on, the control pressure is supplied through the first port, and the valve spool is moved to the right, such that the second port and the fourth port are connected with each other, and the control pressure of the solenoid valve is supplied to the clutch, and when the on-off solenoid valve is turned off, the control pressure of the first port is discharged, and the valve spool is moved to the left, such that the third port and the fourth port are connected with each other, and the line pressure is supplied to the clutch.

Another exemplary embodiment of the present disclosure provides a method of controlling a clutch using a fail-safe valve in a vehicle, the method comprises: determining whether engine torque is a predetermined reference value or more; and turning off an on-off solenoid valve so as to apply line pressure to a clutch when the engine torque is the predetermined reference value or more, and turning on the on-off solenoid valve so as to apply control pressure of the solenoid valve to the clutch when the engine torque is lower than the predetermined reference value.

The method may further include determining whether the fail-safe valve satisfies a hydraulic control test condition by testing for at least one of ignition on, engine cranking, and whether each solenoid valve is normally operated, prior to the determining of whether the engine torque is a predetermined reference value or more.

According to the present specification which has been described above, the present disclosure provides a method and an apparatus for controlling a clutch using a fail-safe valve, which apply relatively high pressure to a specific clutch by controlling the fail-safe valve using an on-off solenoid valve, thereby preventing a slip from occurring in the clutch even while engine torque is high, and preventing a transmission from breaking down.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
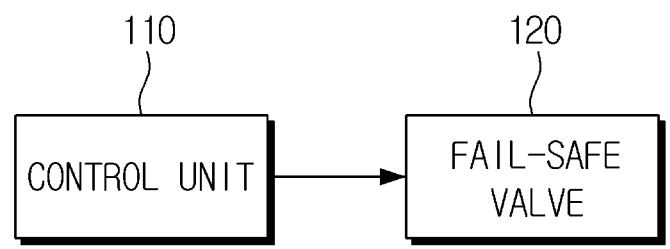
FIG. 1 is a view illustrating a configuration of an apparatus for controlling a clutch using a fail-safe valve according to an exemplary embodiment of the present disclosure.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It should be noted that technical terms used in the present specification are used only to describe a specific exemplary embodiment, and do not intend to limit the present disclosure. Further, if the technical terms used in the present specification are not particularly defined as other meanings in the present specification, the technical terms should be appreciated as meanings generally appreciated by those skilled in the art and should not be appreciated as excessively comprehensive meanings or excessively reduced meanings. Further, when the technical term used in the present specification is a wrong technical term that cannot accurately express the spirit of the present disclosure, the technical term should be appreciated to be substituted by a technical term which can be correctly appreciated by those skilled in the art. In addition, a general term used in the present disclosure should be analyzed as defined in a dictionary or according to front and back contexts, and should not be analyzed as an excessively reduced meaning.

A singular expression used in the present specification includes a plural expression unless it has a definitely opposite meaning in context. Further, in the present application, it should not be analyzed that a term such as "comprising" or "including" particularly includes various components or various steps disclosed in the specification. Further, it is to be understood that some components or some steps among them may not be included, or additional components or steps may be further included.

Suffixes for constituent elements used in the present specification such as "module" and "unit" are given or mixed and used by considering easiness in preparing a specification and do not have a meaning or role distinguished from each other in themselves.

Terms including ordinal numbers such as "first", "second", etc., used in the present specification can be used to describe various constituent elements, but the constituent elements should not be limited by those terms. The above terms are used only to discriminate one component from another component.

For example, without departing from the scope of the invention, a first constituent element may be named as a second constituent element, and similarly, a second constituent element may be named as a first constituent element.

Hereinafter, an exemplary embodiment according to the present disclosure will be described in detail with reference to the accompanying drawings, and the same or similar constituent elements are denoted by the same reference numerals regardless of a sign of the drawing, and repeated description thereof will be omitted.

In the description of the present disclosure, the specific descriptions of publicly known related technologies will be omitted when it is determined that the specific descriptions may obscure the subject matter of the present disclosure. Further, it should be noted that the accompanying drawings are used just for easily appreciating the spirit of the present disclosure, and it should not be analyzed that the spirit of the present disclosure is limited by the accompanying drawings.

FIG. 1 is a view illustrating a configuration of an apparatus for controlling a clutch using a fail-safe valve according to an exemplary embodiment of the present disclosure.

Referring to FIG. 1, an apparatus for controlling a clutch according to the present disclosure includes a control unit 110, a fail-safe valve 120, and the like.

The control unit 110 tests for ignition-on, engine cranking, and whether each solenoid valve is normally operated, and then determines whether the fail-safe valve 120 satisfies a hydraulic control test condition.

The control unit 110 controls the fail-safe valve 120 through the on-off solenoid valve. When engine torque is a predetermined reference value or more, the control unit 110 turns off the on-off solenoid valve to move the fail-safe valve 120 for applying line pressure to the clutch. When the engine torque is lower than the predetermined reference value, the control unit 110 turns on the on-off solenoid valve to move the fail-safe valve 120 for applying control pressure to the clutch.

The control unit 110 determines whether engine torque is a predetermined reference value or more. That is, the control unit 110 determines whether the engine torque is high. In a case in which the engine torque is high, the control unit 110 turns off an on-off solenoid valve so as to move the fail-safe valve 120 to the left, thereby applying line pressure to a clutch.

In a case in which the engine torque is lower than a predetermined reference value, that is, in a case in which the engine torque is low, the control unit 110 turns on the on-off solenoid valve so as to move the fail-safe valve 120 to the right, thereby applying control pressure of the solenoid valve to the clutch.

The fail-safe valve 120 is moved to the left or right according to an on-off operation of the on-off solenoid valve, and controls the clutch by applying the line pressure or the control pressure of the solenoid valve to the clutch. A detailed configuration of the fail-safe valve 120 according to the present disclosure will be described with reference to FIG. 2.

Figure 2:
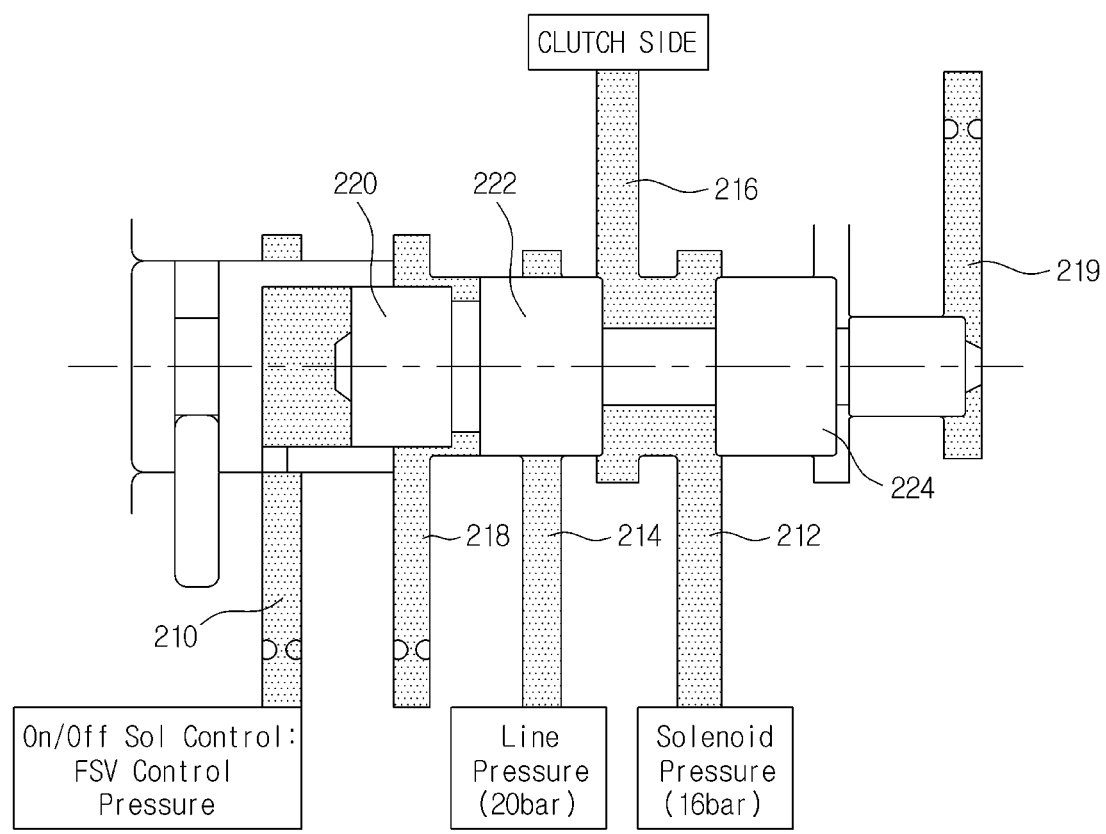
FIG. 2 is a view illustrating a configuration of the fail-safe valve according to the exemplary embodiment of the present disclosure.

FIG. 2 is a view illustrating a configuration of the fail-safe valve according to the exemplary embodiment of the present disclosure.

Referring to FIG. 2, a valve body of the fail-safe valve 120 according to the present disclosure includes a first port 210 which is supplied with the control pressure from the on-off solenoid valve, a second port 212 which is supplied with the control pressure from the solenoid valve, a third port 214 which is supplied with the line pressure, a fourth port 216 which supplies hydraulic pressure supplied from the second port 212 or the third port 214 to the clutch, a fifth port 218 which discharges hydraulic pressure supplied to the fourth port 216, and a sixth port 219 which is supplied with the line pressure.

Meanwhile, a valve spool, which is embedded in the valve body, includes a first land 220 on which the control pressure supplied to the first port 210 is applied, a second land 222 which selectively opens and closes the third port 214, and a third land 224 which selectively connects the fourth port 216 to the second port 212 or the third port 214 together with the second land 222.

Therefore, according to the fail-safe valve 120 according to the present disclosure, when the on-off solenoid valve is turned on, the control pressure is supplied through the first port 210, and the valve spool is moved to the right, such that the second port 212 and the fourth port 216 are connected with each other, and the control pressure of the solenoid valve is supplied to the clutch. On the contrary, when the on-off solenoid valve is turned off, the control pressure of the first port 210 is discharged, and the valve spool is moved to the left, such that the third port 214 and the fourth port 216 are connected with each other, and the line pressure is supplied to the clutch. In detail, when the control pressure of the first port 210 is discharged, the valve spool is moved to the left by a pressure difference between the first port 210 and the sixth port 219.

Figure 3:
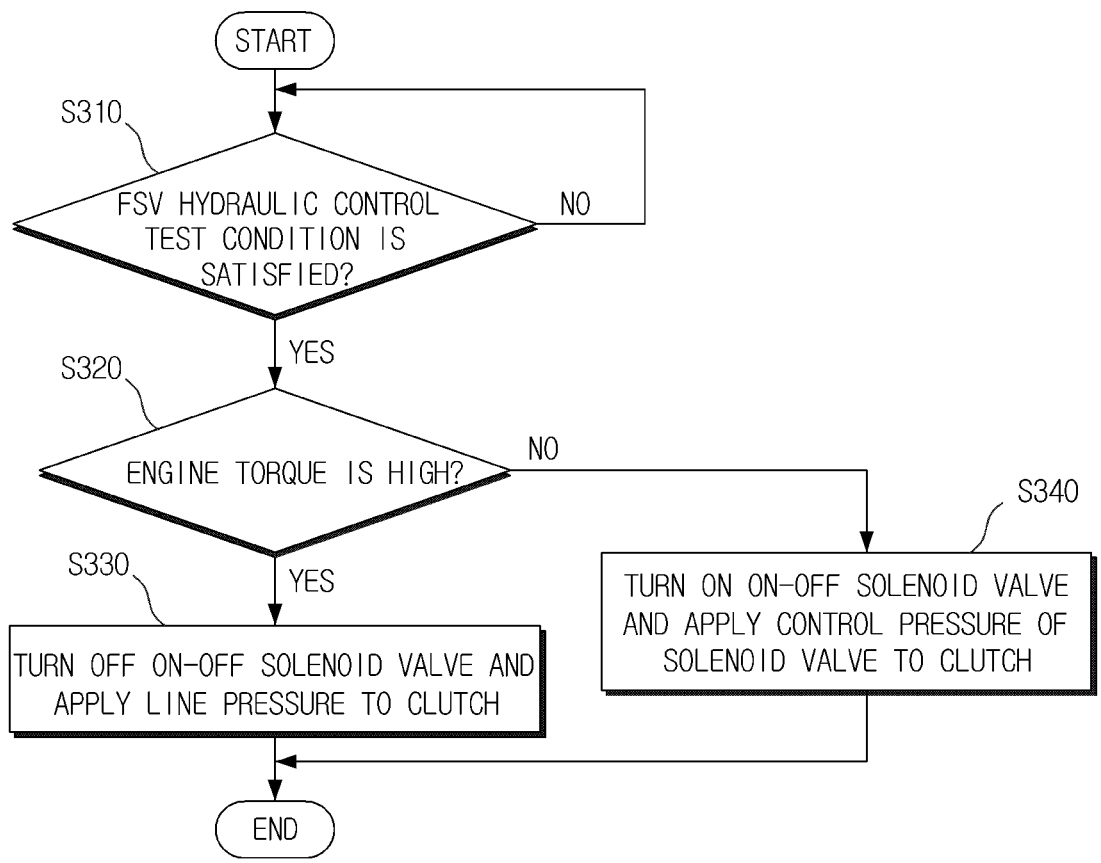
FIG. 3 is a flowchart illustrating a method of controlling a clutch using the fail-safe valve according to the exemplary embodiment of the present disclosure.

FIG. 3 is a flowchart illustrating a method of controlling a clutch using the fail-safe valve according to the exemplary embodiment of the present disclosure.

Referring to FIG. 3, the control unit 110 tests for ignition on, engine cranking, and whether each solenoid valve is normally operated, and then determines whether the fail-safe valve 120 satisfies a hydraulic control test condition (S310).

The control unit 110 determines whether the engine torque is high (S320). In this case, the control unit 110 determines whether the engine torque is a predetermined reference value or more, thereby determining whether the engine torque is high.

In a case in which the engine torque is high, the control unit 110 turns off the on-off solenoid valve, and applies the line pressure to the clutch (S330). In detail, when the on-off solenoid valve is turned off, the valve spool is moved to the left such that the third port 214 and the fourth port 216 are connected with each other, and the line pressure is supplied to the clutch. Therefore, according to the present disclosure, it is possible to prevent a slip from occurring in the clutch even while the engine has high torque.

In a case in which the engine torque is lower than the predetermined reference value, the control unit 110 turns on the on-off solenoid valve, and applies the control pressure of the solenoid valve to the clutch (S340). In detail, when the on-off solenoid valve is turned on, the valve spool is moved to the right, such that the second port 212 and the fourth port 216 are connected with each other, and the control pressure of the solenoid valve is supplied to the clutch.

The aforementioned method may be implemented by various means. For example, the exemplary embodiments of the present disclosure may be implemented by hardware, firmware, software, or a combination thereof.

In the case of implementation by hardware, a method according to the exemplary embodiments of the present disclosure may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

In the case of implementation by firmware or software, a method according to the exemplary embodiments of the present disclosure may be implemented in the form of a module, a procedure, a function, or the like which performs the aforementioned functions or operations. Software codes may be stored in a memory unit, and operated by a processor. The memory unit may be positioned inside or outside the processor, and may transfer and receive data to/from the processor by various means that have been already publicly known.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling a clutch, comprising:
  a fail-safe valve which is moved to the left or right according to an on-off operation of an on-off solenoid valve; and
  a control unit configured to control the fail-safe valve through the on-off solenoid valve; wherein
  when engine torque is a predetermined reference value or more, the control unit turns off the on-off solenoid valve to move the fail-safe valve for applying line pressure to the clutch, and
  when the engine torque is lower than the predetermined reference value, the control unit turns on the on-off solenoid valve to move the fail-safe valve for applying control pressure to the clutch,
  wherein the fail-safe valve includes:
  a first port which is supplied with the control pressure from the on-off solenoid valve,
  a second port which is supplied with the control pressure from the solenoid valve,
  a third port which is supplied with the line pressure,
  a fourth port which supplies hydraulic pressure supplied from the second port or the third port to the clutch,
  a fifth port which discharges hydraulic pressure supplied to the fourth port, and
  a valve spool.

2. The apparatus of claim 1, wherein the valve spool includes:
  a first land on which the control pressure supplied to the first port is applied,
  a second land which selectively opens and closes the third port, and
  a third land which selectively connects the fourth port to the second port or the third port together with the second land.

3. The apparatus of claim 1, wherein when the on-off solenoid valve is turned on, the control pressure is supplied through the first port, and the valve spool is moved to the right, such that the second port and the fourth port are connected with each other, and the control pressure of the solenoid valve is supplied to the clutch, and when the on-off solenoid valve is turned off, the control pressure of the first port is discharged, and the valve spool is moved to the left, such that the third port and the fourth port are connected with each other, and the line pressure is supplied to the clutch.

* * * * *